(12) United States Patent
Nypelö et al.

(10) Patent No.: US 8,371,142 B2
(45) Date of Patent: Feb. 12, 2013

(54) SYSTEM AND METHOD FOR MANUFACTURING FIBRES

(75) Inventors: Tiina Nypelö, Vantaa (FI); Ali Harlin, Kerava (FI); Leena Hupa, Turku (FI); Fredrik Ollila, Turku (FI); Erik Vedel, Parainen (FI); Risto Widerholm, Espoo (FI)

(73) Assignees: Purac Biochem bv, AC Gorinchem (NL); Photonium Oy, Lohja (FI)

( * ) Notice: Subject to any disclaimer, the term of this patent is extended or adjusted under 35 U.S.C. 154(b) by 258 days.

(21) Appl. No.: 12/526,940

(22) PCT Filed: Feb. 13, 2008

(86) PCT No.: PCT/FI2008/050056
§ 371 (c)(1),
(2), (4) Date: Feb. 1, 2010

(87) PCT Pub. No.: WO2008/099058
PCT Pub. Date: Aug. 21, 2008

(65) Prior Publication Data
US 2010/0132410 A1    Jun. 3, 2010

(30) Foreign Application Priority Data
Feb. 13, 2007  (EP) ..................................... 07102244

(51) Int. Cl.
*C03B 37/01*  (2006.01)
(52) U.S. Cl. ................ 65/492; 65/509; 65/475; 65/441; 65/483
(58) Field of Classification Search ................... 65/428, 65/441, 475, 492, 509
See application file for complete search history.

(56) References Cited

U.S. PATENT DOCUMENTS

| | | | |
|---|---|---|---|
| 2,255,578 A | 9/1941 | Baker | 13/6 |
| 2,495,956 A | 1/1950 | Cook | 49/83.1 |
| 3,658,979 A | 4/1972 | Dunn et al. | 264/176 F |
| 4,259,100 A * | 3/1981 | Aulich et al. | 65/502 |
| 2002/0100297 A1 | 8/2002 | Berndt et al. | 65/533 |

FOREIGN PATENT DOCUMENTS

| | | |
|---|---|---|
| GB | 794857 | 5/1958 |
| JP | 60-043406 | 3/1985 |
| JP | 64-003031 | 1/1989 |
| WO | WO 96/38390 | 12/1996 |
| WO | WO 00/13717 | 3/2000 |

OTHER PUBLICATIONS

Machine translation of WO 96/38390, Christodoulopoulos, Process and Device for the Parallel Processing of Molten and Fritted Glass in Glass Wool Manufacture, Dec. 5, 1996.*

Pirhonen et al., "Coating of Bioactive Glass 13-93 Fibres With Biomedical Polymers," 41 *J. Mater. Sci.* 2031 (2006).

Pirhonen et al., "Manufacturing, Mechanical Characterization and In Vitro Performance of Bioactive Glass 13-93 Fibers," 77B *J. Biomed. Mater. Res. Part B Appl. Biomater.* 227 (2006).

* cited by examiner

*Primary Examiner* — Queenie Dehghan
(74) *Attorney, Agent, or Firm* — James C. Lydon

(57) ABSTRACT

The present invention relates to a system for manufacturing fibres comprising a melting furnace, a crucible within said furnace comprising at least one orifice (6) and at least one induction coil (4) for heating the melting furnace and the crucible. In a typical system according to the invention, the crucible comprises at least a first part (1) made of graphite and comprising said at least one orifice (6). The invention also relates to the use of the system as well as to a method for manufacturing fibres and to said fibres.

5 Claims, 2 Drawing Sheets

SYSTEM AND METHOD FOR MANUFACTURING FIBRES

The present invention relates to a system for manufacturing fibres comprising a melting furnace, a crucible comprising at least one orifice and at least one induction coil for heating the melting furnace and the crucible. It further relates to a use of said system as well as to a method for manufacturing fibres and to said fibres.

BACKGROUND

Following publications, references and materials are used herein to illuminate the background of the invention, and they are incorporated by reference. In particular, the cases providing additional details relating to the practice are incorporated by reference.

Bioactive glass is a known bioactive material. Unlike most other bioactive materials, it is easy to control the manufacturing properties of bioactive glass, the rate of its chemical reactions and the biological response caused by it by changing the chemical composition of bioactive glass itself. Bioactive glass has been used in different types of implants, but the manufacturing of fibres from bioactive glass has been found to be difficult.

Some systems and methods for manufacturing glass fibres are disclosed in the literature. For example, document U.S. Pat. No. 3,248,192 discloses a method for the manufacture of fibres from glass, including the manufacture of several fibres at one time. The manufacturing is performed by spinning a molten glass by gravity. Document WO 2006/009802 presents a melter assembly for forming silicone crystals. The assembly comprises a melting crucible that is made of for example fused quartz that is seated on a graphite suspector assembly. The melter assembly also comprises induction coils for heating the suspector and the crucible. Publication JP 63222037 discloses the production of glass fibre by melting a glass block in a crucible and spinning molten glass through a hole in the bottom of the crucible. Publication JP 64003031 presents a method for manufacturing infrared fibres by melt spinning as the area near the nozzle is locally heated at the bottom of the crucible to keep the viscosity of the glass melt in a specific range.

Document U.S. Pat. No. 2,495,956 discloses a device and a method for making glass fibres comprising a platinum crucible placed in a furnace and heated by an induction coil. The crucible is fixed to a ceramic tube and the device also comprises a drawing unit. The method further comprises melting a glass strip in the furnace. This device and method allows the manufacture of fibres with diameters from 4.8 µm to 10 µm.

Pirhonen et al. have manufactured fibres from bioactive glass by melt spinning (E. Pirhonen, H. Niiranen, T. Niemelä, M. Brink and P. Törmälä, Manufacturing, Mechanical Characterization and In Vitro performance of Bioactive glass 13-93 fibres, Journal of Biomedical Materials Research, Applied Biomaterials Vol 77B (2) (2006) and E. Pirhonen, L. Moimas and M. Brink, Mechanical properties of bioactive glass 9-93 fibres, Acta Biomaterials Vol. 2 (2006)). One problem that was encountered in these experiments was the crystallization of the glass in the platinum crucible during glass fibre production.

Due to the crystallization during the manufacturing process when melting or reheating the glass in traditional melting furnaces the fibre drawing process is discontinuous and not suitable for production of large quantities of fibres or for the production of continuous fibres and/or for the production of very thin fibres. The temperature range where crystallization occurs cannot be avoided and it has to be passed rapidly. The temperature used for manufacturing of bioactive glass fibre is usually in the vicinity where crystallization of the glass occurs. Therefore, heating and cooling have to be done fast in order to avoid permanent crystal formation. Other problems are related to the materials of the furnace and their suitability for high temperature and biomedical requirements.

OBJECTS AND SUMMARY OF THE INVENTION

An object of the present invention is to provide a system and method for manufacturing fibres of bioactive and/or resorbable glass wherein the problem of crystallization can be avoided at least to a sufficient degree, if not completely.

Another object of the invention is to provide a system useful in the manufacture of fibres of bioactive glass that suit the temperatures used and may be used for manufacturing fibres intended for medical use, such as for fibres that are to be implanted in humans. Yet another object of the invention is to provide a system useful in the manufacture of fibres of resorbable polymer that may be used for manufacturing fibres intended for medical use, e.g. resorbable vascular or urinary tract stents. A further object of the present invention is to provide a system and method for manufacturing continuous fibres from materials such as bioactive glass as well as for manufacturing very thin fibres.

The present invention thus relates to a system for manufacturing fibres comprising a melting furnace, a crucible comprising at least one orifice and at least one induction coil for heating the melting furnace and the crucible. In a typical system according to the invention, the crucible comprises at least a first part made of a first material and comprising said at least one orifice. Said first material is graphite.

The present invention further relates to a method for manufacturing fibres selected from the group consisting of bioactive glass fibres, resorbable glass fibres, bioactive and resorbable fibres and resorbable polymer fibres, comprising melting a block of bioactive glass in a melting furnace, forming the fibres in a crucible comprising orifices, said melting furnace and crucible being heated with at least one induction coil, wherein said crucible comprises at least a first part made of a first material and comprising said at least one orifice, and wherein said first material is graphite.

The present invention also relates to a use of a system according to the present invention in the manufacture of fibres as well as to said fibres.

DETAILED DESCRIPTION OF THE INVENTION

Figure 1:
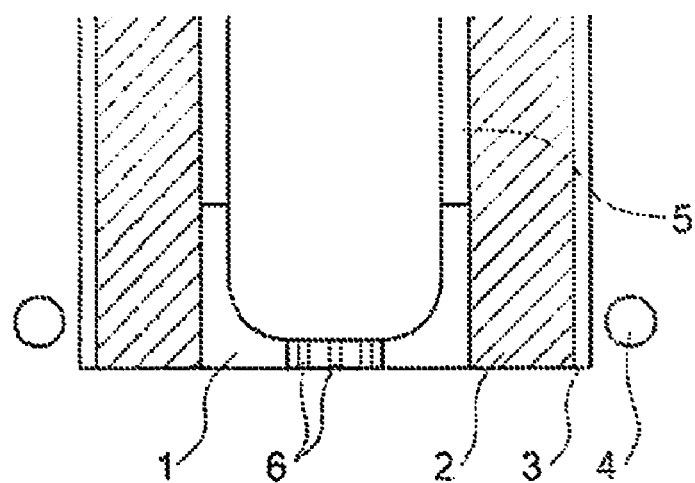
FIG. 1 shows a cross section of a system according to an embodiment of the invention.

The terms used in this application, if not otherwise defined, are those agreed on at the consensus conference on biomaterials in 1987 and 1992, see Williams, D F (ed.): Definitions in biomaterials: Proceedings of a consensus conference of the European Society for Biomaterials, Chester, England. Mar. 3-5, 1986. Elsevier, Amsterdam 1987, and Williams D F, Black J, Doherty P J. Second consensus conference on definitions in biomaterials. In: Doherty P J, Williams R L, Williams D F, Lee A J (eds). Biomaterial-Tissue Interfaces. Amsterdam: Elsevier, 1992. Also the definitions of The Williams Dictionary of Biomaterials (D F Williams 1999) are used.

In this application, by "bioactive material" is meant a material that has been designed to elicit or modulate biological activity. The term "resorbable" in this context means that it is degradable upon prolonged implantation when inserted into mammalian body. By "biomaterial" is meant a material intended to interface with biological systems to evaluate, treat, augment or replace any tissue, organ or function of the body. By "biocompatibility" is meant the ability of a material used in a medical device to perform safely and adequately by causing an appropriate host response in a specific location. By "resorption" is meant reduction/disintegration of biomaterial because of simple dissolution.

Moreover, in this application, when the word "fibre" is used, it is meant any fibre selected from the group consisting of bioactive glass fibres, resorbable glass fibres, bioactive and resorbable fibres and resorbable polymer fibres. When the word "glass" is used, it should be understood as meaning also polymer, where appropriate.

The present invention relates to a system for manufacturing fibres comprising a
  melting furnace,
  a crucible within said furnace, comprising at least one orifice and
  at least one induction coil for heating the melting furnace and the crucible.

In a typical system according to the invention, the crucible comprises at least a first part made of a first material which is graphite, said first part comprising said at least one orifice.

In the system according to the invention, the crucible consists of at least one part made of graphite, which is a magnetic material, thus is affected by the induction field. Said first part is thus heated by the induction coil. The system according to the present invention can naturally be used for drawing fibres from any suitable material, such as glasses and polymers. For example, optical fibres can be drawn with the system according to the present invention.

The crucible of the present invention is typically a cylindrical device having a first end and a second end. The material to be drawn into fibres is introduced into the crucible from the first end, and the second end comprises said at least one orifice. This means that the diameter of said orifice is essentially smaller than the diameter of said first end.

According to an embodiment of the present invention, the crucible consists of two parts, a second part made of a second material, the electromagnetic properties of said second material being different from the electromagnetic properties of the first material. This embodiment thus provides a crucible made of two different materials that have different electromagnetic properties, i.e. they react differently to electromagnetic induction. Electromagnetic induction occurs when a conductor is situated in a changing magnetic flux and an electrical potential difference appears. The reaction to electromagnetic induction depends on the structure of the material. In the system according to this embodiment of the invention, the crucible consists of two parts made of different materials. Typically, as the first material is magnetic material, the second material is a non-magnetic material and is thus not affected by the induction field. The first part made of magnetic material is the one having at least one orifice and thus being typically the lower part. The second part is typically arranged on top of the first part. The parts are connected to each other in any known suitable manner, for example simply by pushing them together.

The system according to this embodiment of the present invention thus enables the manufacturing of fibres of bioactive glass, wherein the problem of crystallization can be avoided at least to a sufficient degree, if not completely. Indeed, the material to be made into fibres, that can be for example bioactive glass, but also any other material, such as resorbable glass or resorbable polymer, is heated only in the lower part of the crucible, and thus the heating occurs quickly, temperature changes are well controlled and the crystallization of glasses and the chemical degradation of polymers can be avoided. The second part of the crucible keeps the temperature in the upper part of the crucible low enough for the material to be melted not to reach its crystallization temperature in this second part, or for the material not to remain in the crystallization temperature long enough for crystallization to occur. The same applies to the temperatures, where chemical degradation of polymers occurs.

The crucible can naturally also be made of one part in one material or of two parts made of same material, which would then be graphite.

The crucible that is placed in the induction furnace thus works as a primary component to form fibres. A preform is fed to the furnace and molten material flows through the crucible under the effect of gravity. The viscosity of the material to be drawn into fibres has to be low enough to enable the solution flow through crucibles orifices but high enough to form continuous fibres when drawn down from the crucible. The size, shape and positioning of orifices affect fibre formation. Flowing and fibre formation can thus also be affected by changing the sizes and shapes of orifices. While actually drawing glass fibres, it might be important to know the devitrification properties of glasses to avoid break downs during the process.

This process can be influenced by adding pressure to the preform. However, in that case the pressure has to be controlled to avoid damage in the crucible. Also a too high pressure can cause disturbance in the melting process, because it can cause the molten glass to rise along the crucible's inner walls.

The critical viscosity of the glass can be concluded from the observed drawing behaviour. After the fibres are flown down, they are collected and guided through the machinery. The fibres are drawn after that by a controlled apparatus.

Melting takes place in induction furnace in temperature that depends on the glass material in the process. Because of the thermal properties of bioactive glasses, it is essential that heating occurs fast and that glasses are kept above their crystallization temperature. During input and melting of bioactive glass preform, the process can be influenced by changing the feeding speed and pressure. The process is preferably surrounded by a protective gas, such as argon or nitrogen, and melting is performed through the induction. The heat is directed to the lowest tip of the crucible by a coil that inducts heat to the crucible.

According to an embodiment of the invention, said second material is selected from the group consisting of oxide ceramics. Some suitable oxide ceramics are aluminium oxide ($Al_2O_3$) and quartz glass.

Aluminium oxide is resistant to thermal shocks, but like all ceramics, it can get brittle when constantly heated and cooled. Aluminium oxide does not take part in induction and this is a reason why it can be used as a part of the crucible. Aluminium oxide ceramic is supposed to possess lower temperature while graphite is heated over 1000° C.

The system according to the present invention thus provides a system useful in the manufacture of fibres of bioactive glass that suit the temperatures used and may be used for manufacturing fibres intended for medical use, such as for fibres that are to be implanted in humans. Indeed, the materials mentioned above can be used in the manufacture of implantable materials. The same applies to resorbable glasses and polymers.

The crucible is also preferably shaped so that the hot zone, where the material melts, is as small as possible, in order to avoid the crystallization and/or degradation of the material. The molten preform mass is preferably allowed to flow through the orifice or orifices without any obstacles. The orifices are preferably designed so that they enhance flowing of the material. The use of materials such as graphite in the first part of the crucible allows the use of longer orifices than in traditional systems, where platinum is typically used for the part with orifices.

According to an embodiment of the invention, said first part of said crucible comprises more than one orifice, such as a number of orifices, said number being selected from the group consisting of two, three, four, five, six, seven, eight, nine, ten, eleven, twelve, thirteen, fourteen, sixteen, seventeen, eighteen, nineteen and twenty. Said number of orifices can naturally also be higher, in accordance of the need of the process, such as thirty, forty, fifty, sixty or even hundred, hundred and fifty, two hundred, two hundred and fifty or three hundred. Multiple orifices give the possibility to draw several fibres at one time, and to obtain for example fibre bundles directly from the manufacturing process, without any need for further processing.

According to another embodiment of the invention the diameter of the orifice(s) of the crucible is typically 0.1-10 mm, more typically 1-7 mm, preferably 3-5 mm, usually approximately 4 mm.

According to another embodiment of the invention the inner diameter of the crucible is typically 10-200 mm, more typically 30-100 mm, preferably 50-70 mm, usually approximately 60 mm.

The present invention thus provides a system that can be used both for forming a monofilament fibre and for forming a multifilament bundle.

Typically, said orifices are arranged symmetrically with respect to a central axis of said crucible.

According to yet another embodiment of the invention, the system further comprises at least one device selected from the group consisting of control system, pyrometer for measuring the temperature in said furnace, fibre drawing unit, fibre coating unit and infrared radiators. Any other suitable devices can also be used, and as is obvious for a person skilled in the art, the system requires means for feeding electricity etc.

Indeed, the system according to the present invention is preferably also equipped with an electronic control system that combines controlling of different component parameters into one system. All the variables can be altered to achieve the optimal fibre drawing conditions. The main principle is to be able to vary several parameters including preform feeding speed and pressure, winding speed, possible coating speed and coating solution concentration and winding tension. Speed of preform feeding can be controlled with process control unit.

The rate of the melting as well as the speed of the winding process can also be used to control the crystallization rate and/or degradation rate of the fibre material.

As is also obvious for a person skilled in the art, the system according to the present invention may also require cooling means as well as a protective atmosphere to prevent the material from chemically reacting with components in the air and/or degradation and/or possible other contamination. The cooling means can be for example a water cooling arrangement and the protective atmosphere can be for example protective gas, such as nitrogen or argon. The protective atmosphere may be required to prevent the material to be drawn into fibres from chemically reacting with components in the air and/or for protecting the material(s) of the crucible. Impurities, such as undesired oxides, can also affect the fibre that is formed or make it unusable in biomedical processes.

A non-contact sensor (pyrometer) may be used for measuring the temperature in the crucible. Having regard to the thermal properties of bioactive glasses and the other materials that can be drawn to fibres with the system according to the present invention, it can be important to know the exact temperature in the crucible. Furthermore, it is easier to track undesired behaviour of the material to be melted, like low viscosity or crystallization when knowing the temperature inside the crucible. The pyrometer can also control the possible under-heating of the crucible. The pyrometer is preferably placed in a way that it forms an angle of 45 degrees with the face of the measuring object, here of the crucible.

An induction furnace thus typically consists of outer shell, coil, protective glass tube, solid insulation, crucible, pyrometer and required gas and water pipes. The crucible is typically situated in the middle of the system and the induction coil is situated around the crucible assembly. Preferably, the crucible and the coil are separated by insulation. A pyrometer hole may be arranged, and it may be arranged in such a manner that it guides the pyrometer in an angle of 45 degrees to measure the temperature of the crucible. A gas flange above the furnace can be used to feed the argon gas. In this flange, there may also be a water cooling system. Water and gas flows are typically controlled with a rotameter.

Some parameters affecting the fibre drawing process are for example pressure and speed in the feeding unit, temperature in the induction furnace, total power, temperature and length of the drying unit as well speed and tension in the take-up. If a coating unit is used, the speed of coating as well as the solution concentration and viscosity are some defining parameters for the process.

The system according to the invention can be used, to the inventor's knowledge, to draw fibres as thin as 15 µm of diameter.

According to another embodiment of the invention, said fibres are further coated with a resorbable material. The coating makes the further processing of the fibres easier and improves their mechanical properties.

Said resorbable material may also be bioactive and is preferably biocompatible. According to one embodiment of the invention the following resorbable polymers, copolymers and terpolymers may be used as coating material: polyglycolide (PGA); copolymers of glycolide, such as glycolide/L-lactide copolymers (PGA/PLLA), glycolide/trimethylene carbonate copolymers (PGA/TMC); polylactides (PLA); stereocopolymers of PLA, such as poly-L-lactide (PLLA), poly-DL-lactide (PDLLA), L-lactide/DL-lactide copolymers; other copolymers of PLA, such as lactide/tetramethylglycolide copolymers, lactide/trimethylene carbonate copolymers, lactide/d-valerolactone copolymers, lactide/ε-caprolactone copolymers; terpolymers of PLA, such as lactide/glycolide/trimethylene carbonate terpolymers, lactide/glycolide/ε-caprolactone terpolymers, PLA/polyethylene oxide copolymers; polydepsipeptides; unsymmetrically 3,6-substituted poly-1,4-dioxane-2,5-diones; polyhydroxyalkanoates, such as polyhydroxybutyrates (PHB); PHB/b-hydroxyvalerate copolymers (PHB/PHV); poly-b-hydroxypropionate (PHPA); poly-p-dioxanone (PDS); poly-d-valerolactone-poly-ε-caprolactone; methylmethacrylate-N-vinyl pyrrolidone copolymers; polyesteramides; polyesters of oxalic acid; polydihydropyrans; polyalkyl-2-cyanoacrylates; polyurethanes (PU); polyvinylalcohol (PVA); polypeptides; poly-b-malic acid (PMLA); poly-b-alkanoic acids; polycarbonates; polyorthoesters; polyphosphates; poly(ester anhydrides); and mixtures thereof.

According to one preferable embodiment of the present invention, the coating polymer material is selected from the group consisting of polymers derived from hydroxy acid units, such as hydroxy acid, hydroxy acid derivative such as cyclic ester of a hydroxy acid (lactone), a cyclic carbonate, such as trimethyl carbonate, L-, D- and DL-lactic acids, L-, D- and DL-lactides and ε-caprolactone. According to yet another embodiment, the polymer material is poly(ε-caprolactone-dl-lactide) copolymer. Also polylactide-co-glycolide (PLGA) or polylactide or poly(ester anhydride) polymers and copolymers based on units derived from hydroxyacids and natural polymers, such as sugars, starch, cellulose and cellulose derivatives, polysaccharides, polypeptides and proteins can be used.

As an example, it can be mentioned that PLA is a resorbable material and it degrades to give lactid acid, $CO_2$ and $H_2O$. Because of these chemical properties, this biomedical polymer is a good material for coating process. Furthermore, it does not disturb the degradation process of the bioactive glass once the fibres are in use.

The coating materials can be used for example in a solution of a suitable solvent, such as acetone. In biomedical applications, the nature of the solvent is naturally to be selected accordingly. The advantage of solvents, such as acetone, is that they evaporate easily. The coating material can also be applied on the fibres as a solution of monomers, and be polymerized on the fibres by heat, light or ultrasound.

Preferably, the coating is applied onto the fibre or fibres during the fabrication process. Coating can be applied with any suitable method, such as by a technique where rotating wheel transfers the solution from a tank to the fibres with the help of rotation.

Typically, the final coating thickness is from 50 nm to 30 μm, preferably from 1 μm to 10 μm.

When heating and drying the fibres, it is preferred that the process is efficient. However, at the same time it has to be sensitive enough not to cause a shock to the fibres.

After the fibre formation, coating and pre-stabilization, fibres can be drawn and wound onto a reel. Winding system may consist for example of capstan and take-up units. Typically, the fibres are wound in bundles to increase the strength. However, the winding tension has to be taken into account because of the stress caused to thin fibres. The winding speed and/or winding with additional weight may also cause tension in the fibres.

The present invention further relates to a method for manufacturing fibres, comprising melting a block of the material to be drawn into fibres in a melting furnace, forming the fibres in a crucible within said furnace and comprising orifices, said melting furnace and crucible being heated with at least one induction coil, wherein said crucible comprises at least a first part made of a first material, which is graphite, said first part comprising said orifices.

According to one embodiment of the invention, said fibres are selected from the group consisting of bioactive glass fibres, resorbable glass fibres, bioactive and resorbable glass fibres, biostable glass fibres, resorbable polymer fibres, biostable polymer fibres and optical fibres.

According to another embodiment of the invention, said bioactive and/or resorbable glass has the following composition:
$SiO_2$ in an amount of 20-100 wt-%,
$Na_2O$ in an amount of 0-34 wt-%,
$K_2O$ in an amount of 0-20 wt-%,
MgO in an amount of 0-30 wt-%,
CaO in an amount of 0-30 wt-%,
$B_2O_3$ in an amount of 0-20 wt-%,
$Al_2O_3$ in an amount of 0-10 wt-%,
$Li_2O$ in an amount of 0-3 wt-%
$P_2O_5$ in an amount of 0-10 wt-%.

According to one embodiment of the invention, said bioactive glass has the following composition:
$SiO_2$ in an amount of 60-80 wt-%,
$Na_2O$ in an amount of 0-15 wt-%,
CaO in an amount of 5-25 wt-%,
$K_2O$ in an amount of 0-15 wt-%,
MgO in an amount of 0-6 wt-%,
$P_2O_5$ in an amount of 0-6 wt-%,
$B_2O_3$ in an amount of 0-15 wt-%,
$Al_2O_3$ in an amount of 0-5 wt-%,
$Li_2O$ in an amount of 0-1 wt-%
provided that
$Na_2O+K_2O$ is less than 15 wt-%.

According to one embodiment of the invention, said bioactive glass has the following composition:
$SiO_2$ in an amount of 53-60 wt-%,
$Na_2O$ in an amount of 0-34 wt-%,
$K_2O$ in an amount of 1-20 wt-%,
MgO in an amount of 0-5 wt-%,
CaO in an amount of 5-25 wt-%,
$B_2O_3$ in an amount of 0-4 wt-%,
$P_2O_5$ in an amount of 0.5-6 wt-%,
provided that
$Na_2O+K_2O$=16-35 wt-%
$K_2O+MgO$=5-20 wt-%, and
$MgO+CaO$=10-25 wt-%.

This composition has been disclosed in WO 96/21628, the content of which is herein incorporated by reference.

According to another embodiment of the invention, the bioactive glass has the composition of
$SiO_2$ is 53 wt-%,
$Na_2O$ is 23 wt-%,
CaO is 20 wt-% and
$P_2O_5$ is 4 wt-%.

According to yet another embodiment of the invention the bioactive glass has the composition of
$SiO_2$ is 51-56 wt-%,
$Na_2O$ is 7-9 wt-%,
CaO is 21-23 wt-%,
$K_2O$ is 10-12 wt-%,
MgO is 1-4 wt-%,
$P_2O_5$ is 0.5-1.5 wt-% and
$B_2O_3$ is 0-1 wt-%,
provided that the total amount of $Na_2O$ and $K_2O$ is 17-20 wt-% of the starting oxides. This composition has been disclosed in WO 2004/031086, the content of which is herein incorporated by reference.

According to one embodiment of the invention, said resorbable polymers to be used to manufacture fibers may be for example polyglycolide (PGA); copolymers of glycolide, such as glycolide/L-lactide copolymers (PGA/PLLA), glycolide/trimethylene carbonate copolymers (PGA/TMC); polylactides (PLA); stereocopolymers of PLA, such as poly-L-lactide (PLLA), poly-DL-lactide (PDLLA), L-lactide/DL-lactide copolymers; other copolymers of PLA, such as lactide/tetramethylglycolide copolymers, lactide/trimethylene carbonate copolymers, lactide/d-valerolactone copolymers, lactide/ε-caprolactone copolymers; terpolymers of PLA, such as lactide/glycolide/trimethylene carbonate terpolymers, lactide/glycolide/ε-caprolactone terpolymers, PLA/ polyethylene oxide copolymers; polydepsipeptides; unsymmetrically 3,6-substituted poly-1,4-dioxane-2,5-diones; polyhydroxyalkanoates, such as polyhydroxybutyrates (PHB); PHB/b-hydroxyvalerate copolymers (PHB/PHV); poly-b-hydroxypropionate (PHPA); poly-p-dioxanone (PDS); poly-d-valerolactone-poly-$\epsilon$-caprolactone; methylmethacrylate-N-vinyl pyrrolidone copolymers; polyesteramides; polyesters of oxalic acid; polydihydropyrans; polyalkyl-2-cyanoacrylates; polyurethanes (PU); polyvinylalcohol (PVA); polypeptides; poly-b-malic acid (PMLA); poly-b-alkanoic acids; polycarbonates; polyorthoesters; polyphosphates; poly(ester anhydrides); and mixtures thereof.

According to one preferable embodiment of the present invention, the polymer material is selected from the group consisting of polymers derived from hydroxy acid units, such as hydroxy acid, hydroxy acid derivative, such as cyclic ester of a hydroxy acid (lactone), a cyclic carbonate, such as trimethyl carbonate, L-, D- and DL-lactic acids, L-, D- and DL-lactides and $\epsilon$-caprolactone. According to yet another embodiment, the polymer material is poly($\epsilon$-caprolactone-dl-lactide) copolymer. Also polylactide-co-glycolide (PLGA) or polylactide or poly(ester anhydride) polymers and copolymers based on units derived from hydroxyacids and natural polymers, such as sugars, starch, cellulose and cellulose derivatives, polysaccharides, polypeptides and proteins can be used.

For the manufacture of fibres using the system according to the present invention, the material to be formed to fibres is typically casted into preforms. It is preferable that preforms are uniform and do not have air trapped inside them. Indeed, air and variations in dimensions may cause stress inside the preforms and promote uneven melting or unexpected phenomenon, for example cracking of preform during melting. Non-uniform preforms and gaseous inclusions might also act as nucleation sites for crystals and should thus be avoided. The process can be further improved by removing the heads of the preforms that were formed during casting.

The casted preform is preferably close to the size and shape of the crucible. Indeed, it is preferable, if the space between the preform and the walls of the crucible is as small as possible, in order to prevent the molten material from flowing upwards in the crucible.

It is to be noted that all details and embodiments discussed above apply also to the method according to the invention and vice versa.

The present invention further relates to a fibre obtainable by the method according to the present invention, said fibre having a diameter of 1-50 µm. According to an embodiment of the invention, said diameter is 10-30 µm. All details and embodiments discussed above apply also to the fibres according to the invention and vice versa.

The present method thus allows the manufacture of thinner continuous fibres than the prior art methods, as well as the manufacture of larger amounts of fibres than prior art methods. Typically, a prior art method allowed for the manufacture of 20 g of fibres, whereas the present method allows the manufacture of several kilograms of fibres.

The present invention also relates to a use of a system according to the present invention in the manufacture of fibres. According to one embodiment, said fibres are selected from the group consisting of bioactive glass fibres, resorbable glass fibres, bioactive and resorbable glass fibres, biostable glass fibres, resorbable polymer fibres, biostable polymer fibres and optical fibres. All details and embodiments discussed above apply also to the use according to the invention and vice versa.

In this specification, except where the context requires otherwise, the words "comprise", "comprises" and "comprising" means "include", "includes" and "including", respectively. That is, when the invention is described or defined as comprising specified features, various embodiments of the same invention may also include additional features. The reference signs are also not to be construed as limiting the claims.

DETAILED DESCRIPTION OF THE DRAWING

FIG. 1 shows a cross section, in a vertical view, of a system according to a first embodiment of the invention, in a schematical way. The Figure shows a first part 1 of the crucible made of graphite, insulation 2, protective glass 3, induction coil 4, a second part 5 of the crucible made of aluminium oxide, as well as orifices 6.

Figure 2:
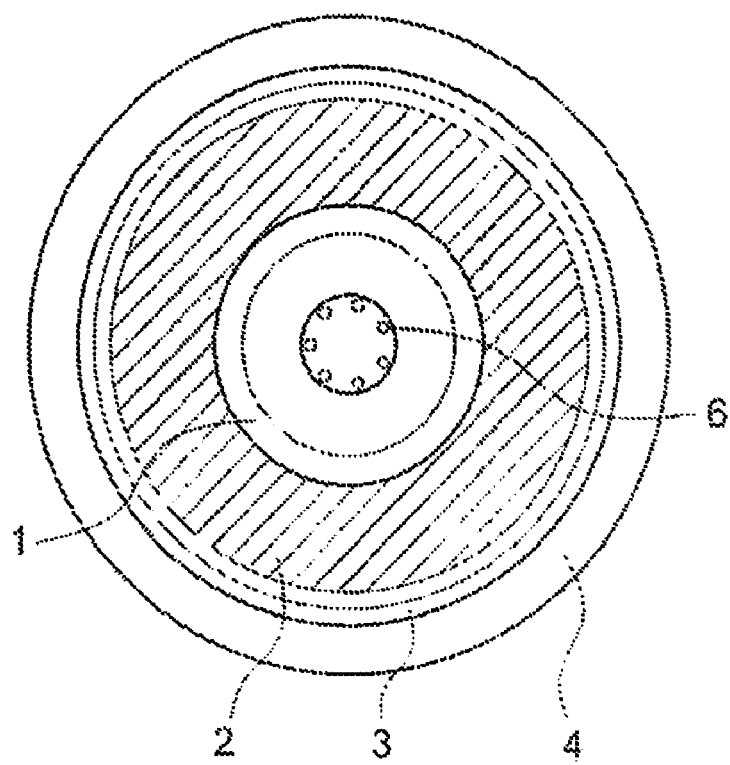
FIG. 2 shows a further cross section of the system of FIG. 1.

FIG. 2 shows a further cross section, in the horizontal view, of the system of FIG. 1. The Figure shows a horizontal cross section of the crucible, wherein the same reference numbers are used as in FIG. 1. In this embodiment, there are seven orifices 6 arranged in a circular manner. The orifices 6 are formed in the first part 1 of the crucible. The first part 1 is surrounded by insulation 2, made of low density graphite, further surrounded by protective glass 3. The induction coil 4 is arranged around the protective glass 3. In this embodiment, all these parts are arranged concentrically. They can naturally be arranged in some other manner, while keeping in mind that a symmetrical arrangement is the easiest to control with respect to the heating and cooling.

Figure 3A:
FIGS. 3a-3d show cross sections of different orifices useful in the present invention.
Figure 3B:
Figure 3C:
Figure 3D:
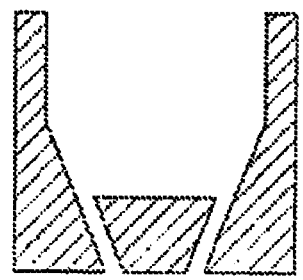

FIGS. 3a-3d show cross sections of different orifices useful in the present invention. In FIG. 3a, a cylindrical straight orifice is shown. FIG. 3b shows an orifice having the combined shape of cylinder and cone. FIG. 3c shows a modified orifice with the combined shape of cylinder and cone, and FIG. 3d shows a further modification of the same combined shape.

Experimental Part

The bioactive glass preforms used in this experimental part were manufactured by Åbo Akademi, Turku, in co-operation with Vivoxid Ltd. Glass for the preforms was manufactured by melting the appropriate batches at temperatures high enough to allow complete raw material reactions and fining of gases after which the melt was cast into moulds and annealed. The obtained mass of bioactive glass was then crushed and melted again to obtain a homogeneous glass solution. The molten bioactive glass was then heat treated in a furnace at 1360° C. for 3 hours. After this, molten glass was poured into graphite moulds to form a preform having the desired size and shape. After the glass had solidified, the mould was opened and the preform was placed into an annealing furnace for heat treatment at 520° C. for one hour. After one hour, the annealing furnace was turned off and the preform was let to cool down overnight.

The first part of the crucible was made of graphite and the second part was made of aluminium oxide. The orifices used were according to FIG. 3b. The angle between the walls of the cone was 90° and the diameter of the lower cone was 4 mm. The outer diameter of the crucible was 53 mm and the inner diameter 47 mm. The crucible had seven orifices and the wall thickness was approximately 3 mm.

The graphite used in the experiments was ordered from Toyo Tanso Co. Its properties were the following. Bulk density 1.85 kg/dm$^3$, hardness (Shore) 60, specific resistivity 10.0 µΩ·m, flexural strength 49.0 MPa, compressive strength 103.0 MPa, tensile strength 1.8 MPa, coefficient of thermal expansion (CTE) $5.0 \cdot 10^{-6}/°C$. and thermal conductivity 128 W(m·K).

The aluminium oxide used in the experiments was ordered from Finemat Co.

Argon was used as protective gas.

PLA used in the experiments was purchased from Boehringer Ingelheim GmbH & Co. in the form of white to off-white granulates and had the following properties.

Trade name Resomer® LR 708, chemical name Poly(L-lactic-co-D,L-lactide), Inherent viscosity 5.5-6.5 dl/g The final coating thickness was from 2.5 μm to 10 μm. The solvent that was used was acetone, which is a toxic solvent that evaporates easily.

Two IR-radiator units manufactured by Meyer-vastus, Finland (power 600 W) were used to stabilize the fibres and dry the coating in this process. They were positioned in vertical direction and heated from 100 up to 300° C. during the experiments, the optimal temperature being defined during experiments.

Bioactive glass A having the following composition was tested.

$SiO_2$ in an amount of 53 wt-%,
$Na_2O$ in an amount of 6 wt-%,
$K_2O$ in an amount of 12 wt-%,
MgO in an amount of 5 wt-%,
CaO in an amount of 20 wt-%,
$P_2O_5$ in an amount of 4 wt-%.

The size of the preform, when measured, is expressed in diameter (D), height (h) and weight (m).

EXAMPLES

Example 1

A short preform of the glass A was fabricated, having a diameter D of 40 mm and a height h of 30 mm and drawn into fibres using a crucible with orifices of 4 mm in diameter. The temperature indicated by the pyrometer was around 850° C. when the fabrication started and was raised up to 1000° C. The drawing speed was 40 m/min and the drawing was preformed successfully.

Example 2

A preform of the glass A was fabricated, having a diameter D of 40 mm and a height h of 40 mm and drawn into fibres using a crucible with orifices of 4 mm in diameter. The coating unit was used to coat the fibres with a PLA solution having 1.5 g of PLA in 100 ml of acetone. The temperature of the IR drying units was 100° C. A capstan was used to direct the fibre to the take-up and the fibres were wound onto the reel successfully. The drawing speed was 40 m/min.

Example 3

Example 2 was repeated except that the temperature of the IR drying units was 300° C. and the drawing speed was 200 m/min. The temperature indicated by the pyrometer was around 950° C. Drawing of the fibres was performed without problems.

Example 4

A preform of the glass A was fabricated, having a diameter D of 40 mm, a height h of 40 mm and a weight m of 260 g and drawn into fibres using a crucible with orifices of 4 mm in diameter. The coating unit was used to coat the fibres with a PLA solution having 1.5 g of PLA in 100 ml of acetone. The temperature of the IR drying units was 330° C. and the temperature indicated by the pyrometer was from 950 to 1050° C. A capstan was used to direct the fibre to the take-up and the fibres were wound onto the reel successfully. The drawing speed was increased during the example and was 200 m/min at the end of the example.

Example 5

A preform of the glass A was fabricated, having a diameter D of 40 mm and a weight m of 466 g and drawn into fibres using a crucible with orifices of 4 mm in diameter. The coating unit was used to coat the fibres with a PLA solution having 1.5 g of PLA in 100 ml of acetone. The temperature of the IR drying units was 330° C. and the temperature indicated by the pyrometer was around 950° C. A capstan was used to direct the fibre to the take-up and the fibres were wound onto the reel successfully. The drawing speed was increased during the example and was 400 m/min at the end of the example. The pressure caused by the larger preform improved the drawing results.

Example 6

A preform of the glass A was fabricated, having a diameter D of 40 mm and a weight m of 132 g and drawn into fibres using a crucible with orifices of 4 mm in diameter. The coating unit was used to coat the fibres with a PLA solution having 1.5 g of PLA in 100 ml of acetone. The temperature of the IR drying units was 330° C. and the temperature indicated by the pyrometer was around 950° C. A capstan was used to direct the fibre to the take-up and the fibres were wound onto the reel successfully. The drawing speed used was 150 m/min.

Example 7

A preform of the glass A was fabricated, having a diameter D of 40 mm and a weight m of 132 g and drawn into fibres using a crucible with orifices of 3 mm in diameter. The coating unit was used to coat the fibres with a PLA solution having 1.5 g of PLA in 100 ml of acetone. The temperature of the IR drying units was 330° C. and the temperature indicated by the pyrometer was 967° C. A capstan was used to direct the fibre to the take-up and the fibres were wound onto the reel successfully. The drawing speed used was 100 m/min.

The glass fibres having the composition A were thus produced by using different parameters. It was found that a temperature around 950° C. as measured by the pyrometer was optimal for the fabrication of fibres from this glass. Higher temperatures caused bubble formation inside the fibres and lower ones caused fibres to break. This glass functioned well both with a crucible with orifices of 4 mm and of 3 mm in diameter. Nevertheless, 3 mm orifices caused decrease in the drawing speed.

Fibres drawn with speeds 40 m/min and 200 m/min were analyzed with scanning electron microscope, and the mean diameter was found to be 113 μm and 50 μm, respectively.

Moreover, three resorbable glasses B, C and D were also tested. They could also be successfully drawn into fibres. Their compositions were as follows.

Resorbable glass B:
$SiO_2$ in an amount of 64.5 wt-%,
$Na_2O$ in an amount of 11 wt-%,
MgO in an amount of 2 wt-%,
CaO in an amount of 18 wt-%, $B_2O_3$ in an amount of 2 wt-%,
$Al_2O_3$ in an amount of 2.5 wt-%.
Resorbable glass C:
$SiO_2$ in an amount of 63 wt-%,
$Na_2O$ in an amount of 5 wt-%,
$K_2O$ in an amount of 10 wt-%,
MgO in an amount of 4 wt-%,
CaO in an amount of 14 wt-%,
$B_2O_3$ in an amount of 2 wt-%,
$P_2O_5$ in an amount of 2 wt-%.
Resorbable glass D:
$SiO_2$ in an amount of 69.5 wt-%,
$Na_2O$ in an amount of 8 wt-%,
$K_2O$ in an amount of 5 wt-%,
CaO in an amount of 12 wt-%,
$B_2O_3$ in an amount of 2 wt-%,
$Al_2O_3$ in an amount of 2.5 wt-%,
$P_2O_5$ in an amount of 1 wt-%.

The invention claimed is:

1. A method for manufacturing bioactive and/or resorbable glass fibres, comprising
melting a preform block of bioactive and/or resorbable glass to be drawn into fibre in a melting furnace,
forming the bioactive and /or resorbable glass fibres using a crucible within said furnace and comprising orifices,
said melting furnace and crucible being heated with at least one induction coil,
wherein said crucible comprises at least a first part made of a first material, which is graphite, said first part comprising said orifices, and a second part which is made from a ceramic oxide and which is above said first part,
such that said bioactive and/or resorbable glass contacts both said both the first and second parts and crystallization of said bioactive and/or resorbable glass is avoided.

2. Method according to claim 1, wherein the composition of said glass is
$SiO_2$ in an amount of 20-100 wt-%,
$Na_2O$ in an amount of 0-34 wt-%,
$K_2O$ in an amount of 0-20 wt-%,
MgO in an amount of 0-30 wt-%,
CaO in an amount of 0-30 wt-%,
$B_2O_3$ in an amount of 0-20 wt-%,
$Al_2O_3$ in an amount of 0-10 weight-%,
$Li_2O$ in an amount of 0-3 weight-%,
$P_2O_5$ in an amount of 0-10 wt-%.

3. Method according to claim 1, wherein fibres formed are coated with a resorbable polymer material.

4. Method according to claim 3, wherein said resorbable polymer material is selected from the group consisting of polyglycolide (PGA), glycolide/L-lactide copolymers (PGA/PLLA), glycolide/trimethylene carbonate copolymers (PGA/TMC), polylactides (PLA), poly-L-lactide (PLLA), poly-DL-lactide (PDLLA), L-lactide/DL-lactide copolymers, lactide/tetramethylglycolide copolymers, lactide/trimethylene carbonate copolymers, lactide/d-valerolactone copolymers, lactide/ε-caprolactone copolymers.

5. The method of claim 1, wherein said ceramic oxide is aluminum oxide or quartz glass.

* * * * *